Patented May 11, 1937

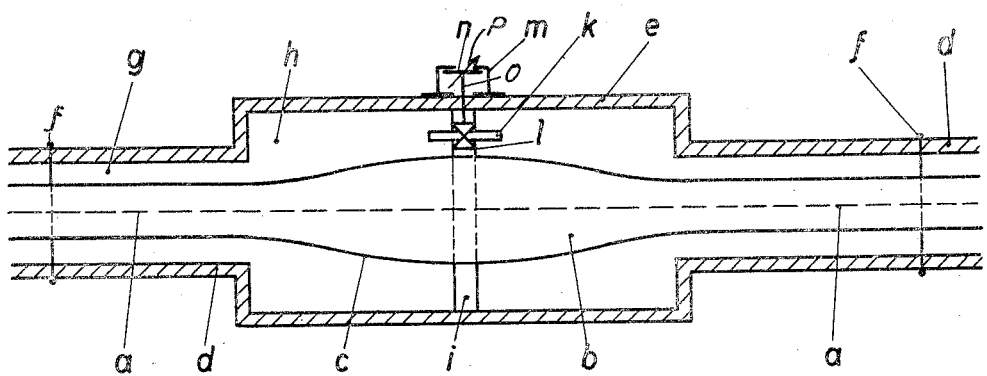
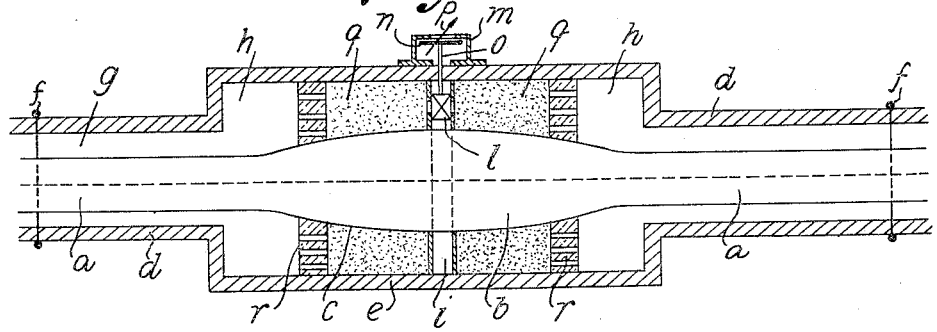

2,079,856

UNITED STATES PATENT OFFICE 2,079,856

ELECTRIC CABLE INSTALLATION

Martin Hochstadter, Brussels, Belgium, and Wilhelm Vogel, Cologne-Mulheim, Germany, assignors, by mesne assignments, to Protona A. G., Basel, Switzerland Application May 27, 1931, Serial No. 540,472
In Germany June 3, 1930

9 Claims. (Cl. 247—3)

Cable systems are known in which use is made of the fact that the properties of the dielectric are improved if it is placed under pressure. In such cable installations pressure ducts are required, which render it possible, from particular points of the network, to keep the entire length of cable under pressure, by keeping the duct filled with a suitable pressure fluid from the said points. Either liquids or gases may come into consideration as the pressure fluid. Gases such as atmospheric air, nitrogen, carbon dioxide and the like have been found particularly advantageous for use as pressure fluids.

The advantages of employing gases as pressure fluids are, above all, to be found in the fact that great lengths of cable can be kept under pressure from the terminal stations in an exceedingly simple manner without interposing intermediate appliances, that furthermore the overcoming of differences of level presents no sort of difficulty and that the changes of volume of the pressure fluid with changes of temperature of the plant can also be controlled in the simplest manner without special appliances. These advantages rest primarily upon the small co-efficient of friction that is characteristic of gases and upon their great compressibility and low specific gravity.

From the same properties of gases there arises however the disadvantage that in the event of a fault occurring in long cable ducts a sudden expansion and emptying occurs throughout a great length of a cable in the event of a local escape of gas.

The object of the present invention is to obviate this disadvantage and at the same time to provide the possibility of a simple method of localizing faults, as far as possible with automatic separation and indication of the defective part or of the defective manufacturing length of a section of cable.

This object is attained by providing at suitable places in a section of cable, preferably in the joints or connecting sleeves between the individual manufacturing lengths, artificially increased resistances to the flow of the gas under pressure, preferably in conjunction with devices which, in the event of a fault, actuate shut-off devices or indicating members, or both, at both ends of the defective section, owing to the abnormal pressure drop arising at the artificially increased flow resistance.

Two constructional examples of the invention as applied to a cable joint are diagrammatically illustrated in sectional elevation in Figs. 1 and 2 of the accompanying drawing.

In Fig. 1, $a$, $a$ are the two pieces of cable united in the sleeve by a wrapping joint $b$. It is substantially immaterial what kind of cables are to be united in the sleeve, and in the present example it is assumed that the cable is fundamentally of the kind described in Patent Nos. 1,849,624 and 1,849,875, in which the pressure fluid is different from the insulating medium, and the two are separated from one another by an impervious but flexible sheath. As such a sheath a lead covering $c$ is assumed, which encloses the cable $a$ and the wrapping $b$.

In the drawing only a single cable is indicated, which is located in the pressure duct $g$. This cable may be a single-core cable or a multi-core cable, and a plurality of such single-core or multi-core cables sheathed in lead may be lodged in one and the same pressure duct $g$.

The pressure duct $g$ is, according to application No. 541,075, filed on the 29th May 1931, which has matured into Patent No. 2,054,046, granted Sept. 8, 1936 formed by tubes $d$, into which the cables are drawn, and which may consist of steel or other suitable material capable of withstanding the pressure. In the case of the coupling illustrated in the drawing the tubes are connected to an outer sleeve made of the same or a similar strong material, preferably by welding, at the positions $f$, $f$.

This external protective sleeve $e$ contains the wrapping joint $b$, and surrounds the same with sufficient clearance space $h$, which establishes a through connection for the pressure duct $g$.

Now according to the invention this connection of the pressure duct is interrupted by an intermediate piece $i$, which presents a definite resistance to the passage of the gas. This intermediate piece and this resistance may be embodied in various forms. In the constructional example selected it is assumed for the sake of simplicity that the intermediate piece consists of a partition which is connected with the outer protective sleeve $f$ and with the lead sheath $c$ of the cable in a gas-tight manner and has a passage aperture $k$ of definite length and of definite cross-section. This passage aperture is closable by means of a valve $l$, a rotary plug, a slide valve, or in some other manner. The closing and opening of this valve are effected either by hand or else automatically (or both). In the example illustrated the means provided for the automatic operation consist of a casing $m$ wherein a rotary member provided with blades (not shown) is secured to a spindle $o$, to which the rotary plug $l$ is attached. The interior of the casing $m$ is in communication with both sides of the space $h$ through openings (not shown). The rotary member is secured in its normal position corresponding to the position in which the plug $l$ is open, for instance, by means of a spring. A tell-tale disc $p$ provided with an index, as is diagrammatically indicated by the arrow $n$, is arranged at the top of the casing to indicate whether the plug is open or closed.

The device $m$ may be set in motion automatically by being influenced in any known manner by the difference in pressure between the two spaces $h$, $h$ to left and right of the partition $i$.

The method of operation of the arrangement is as follows:—

In the normal condition the passage $k$ is opened by the valve $l$ in all the joints of the section, so that a continuous pressure duct exists throughout the entire length of the cable, the individual sections being in communication with one another through the successive passage apertures $k$. This condition is maintained as long as there is no pressure difference of a definite magnitude in a sleeve between the two halves of the chamber $h$, such as suffices to release the device $m$ and thereby to close the valve $l$.

Such a difference of pressure cannot, however, arise under normal circumstances. Even during the refilling of a length of cable with gas under pressure this is not possible, provided the filling is slowly effected. This difference of pressure can only come into existence when a sudden variation in pressure arises in one section between two sleeves owing to the pipe line $d$ bursting.

As soon as such a sudden variation in pressure arises, the device $m$ is released by the difference in pressure and closes the valve $l$ at both ends of the section that has become defective. By this means the result is obtained that not only do the remaining parts of the length of cable in question remain under normal pressure but the defective piece is readily ascertainable by the tell-tale disc $n$ at both its terminal sleeves indicating that the valves are closed.

In the drawing the simplest possible construction of the invention has been illustrated. Obviously, however, the construction of the invention may be varied in a variety of ways. For instance, instead of one flow resistance $i$, $k$ in the sleeve two or more such resistances may be provided, for instance one at the end of each of the two pressure ducts, where they open into the sleeve casing, in such a way that these two flow resistances either actuate a common shut-off or indicating member, or each resistance actuates such a member of its own. This constructional form presents the advantage that when repairs are being carried out each of the pressure ducts opening into the sleeve can be separately sealed.

The construction of the flow resistance $i$, $k$ itself may also differ in a variety of ways from the partition assumed in the drawing with a passage aperture in the form of a tube or capillary. Instead of this, for instance a system of capillary tubes, or a porous partition or any similar arrangement may be adopted.

A particularly advantageous form of construction of the flow resistance consists in a layer of sand or similar material of suitable size of grain. This layer of sand is particularly easy to dimension in such a way that a resistance of the desired magnitude is obtained. For instance a definite portion of the sleeve casing, or its entire length, may be filled with sand, or else any other desired piece of the pressure piping, in which case the sand may be poured, or even pressed, in between two sieve-like holding discs secured in the latter.

This form of construction is illustrated in Fig. 2 which differs from Fig. 1 in that the tube $k$ representing the resistance to the flow of gas is replaced by a layer of sand $q$, which is provided for the same purpose and is pressed together by two perforated discs $r$.

What we claim is:—

1. An underground electric cable installation having a channel for a pressure gas, means arranged at suitable places along the cable capable of allowing the passage of the pressure gas through the said channel, but artificially increasing the resistance to its passage, shut-off members, and devices, which in the case of fault, are capable of actuating the said shut-off members at both ends of the defective section, as a result of the abnormal difference of pressure arising at the artificially increased resistance to flow, for the purposes set forth.

2. An underground electric cable installation having means as claimed in claim 1, in which the said means are located at the joints between the individual manufacturing lengths of cable.

3. An underground electric cable installation having a channel for a pressure gas, means arranged at suitable places along the cable capable of allowing the passage of the pressure gas through the said channel, but artificially increasing the resistance to its passage, shut-off members, indicating members, and devices, which in the case of fault, are capable of actuating the said shut-off members and indicating members at both ends of the defective section, as a result of the abnormal difference of pressure arising at the artificially increased resistance to flow, for the purposes set forth.

4. An underground electric cable installation having a channel for a pressure gas, means arranged at suitable places along the cable capable of allowing the passage of the pressure gas through the said channel, but artificially increasing the resistance to its passage, shut-off members, and devices, which in the case of fault, are capable of actuating the said shut-off members at both ends of the defective section, as a result of the abnormal difference of pressure arising at the artificially increased resistance to flow, the said means consisting of a layer of a pulverulent material having a suitable size of grain in combination with perforated holding discs for the purposes set forth.

5. An electric power transmission system comprising in combination an impervious pipe, separately insulated cable conductors in said pipe, pressure supply means at each end of the system for maintaining said pipe filled with oil under high pressure in which said cable conductors are immersed, and automatic shut-off valves connected into said pipe at intervals and adapted to permit of a normal movement of the said oil longitudinally of the pipe in both directions, abnormal movement of the said oil due to the same escaping through a leak in the pipe effecting closure of a valve at each side of the leak automatically to isolate the leaking portion of the pipe to prevent draining of the system of oil.

6. An electric power transmission system comprising in combination a plurality of separately insulated cable conductors, an impervious pipe enclosing said conductors, pressure supply means at each end of the system for maintaining said pipe filled with oil under high pressure in which said insulated conductors are immersed, automatic shut-off valves connected into said pipe at spaced intervals along said pipe and adapted to permit of normal movement of the oil longitudinally of the pipe in both directions, predetermined movement of the oil in the pipe due to a leak in the pipe closing a valve at each side of the leak to isolate the leaking portion of the pipe to prevent draining the system of oil, and indicating means cooperable with the isolating means for indicating the defective portion.

7. An electric power transmission system comprising in combination an impervious pipe, separately insulated cable conductors in said pipe, pressure supply means for maintaining said pipe filled with oil under high pressure in which said insulated conductors are immersed, joints at intervals along said pipe, pipes communicating with the interior of the first mentioned pipe at each side of said joints, automatic shut-off valves in said pipes adapted to permit of movement of the oil longitudinally of the first mentioned pipe in both directions, abnormal movement of the oil due to a leak in the first mentioned pipe effecting closure of a valve at each side of the leak automatically to isolate the leaking portion of the pipe to prevent draining of the system.

8. An electric power transmission system comprising in combination an impervious pipe, separately insulated cable conductors in said pipe, pressure supply means at each end of the system for maintaining said pipe filled with fluid under high pressure in which said cable conductors are immersed, and automatic shut-off valves connected into said pipe at intervals and adapted to permit of a normal movement of the said fluid longitudinally of the pipe in both directions, abnormal movement of the said fluid due to the same escaping through a leak in the pipe effecting closure of a valve at each side of the leak automatically to isolate the leaking portion of the pipe to prevent draining of the system of fluid.

9. An electric power transmission system comprising in combination an impervious pipe, separately insulated cable conductors in said pipe, pressure supply means at each end of the system for maintaining said pipe filled with liquid under high pressure in which said cable conductors are immersed, and automatic shut-off valves connected into said pipe at intervals and adapted to permit of a normal movement of the said liquid longitudinally of the pipe in both directions, abnormal movement of the said liquid due to the same escaping through a leak in the pipe effecting closure of a valve at each side of the leak automatically to isolate the leaking portion of the pipe to prevent draining of the system of liquid.

MARTIN HOCHSTADTER.
WILHELM VOGEL.